(12) United States Patent
Nobuhira et al.

(10) Patent No.: US 7,850,225 B2
(45) Date of Patent: Dec. 14, 2010

(54) MOTORCYCLE

(75) Inventors: Takayuki Nobuhira, Iwata (JP); Toshiaki Ozawa, Iwata (JP)

(73) Assignee: Yamaha Hatsudoki Kabushiki Kaisha, Shizuoka (JP)

(*) Notice: Subject to any disclaimer, the term of this patent is extended or adjusted under 35 U.S.C. 154(b) by 0 days.

(21) Appl. No.: 11/679,773

(22) Filed: Feb. 27, 2007

(65) Prior Publication Data
US 2007/0205631 A1 Sep. 6, 2007

(30) Foreign Application Priority Data
Mar. 1, 2006 (JP) .............................. 2006-054658

(51) Int. Cl.
*B62D 61/02* (2006.01)
(52) U.S. Cl. .................... 296/191; 296/181.2; 296/78.1; 180/219
(58) Field of Classification Search ................. 296/191, 296/181.1, 181.2, 193.05, 203.03, 78.1, 77.1
See application file for complete search history.

(56) References Cited
U.S. PATENT DOCUMENTS

| | | | | |
|---|---|---|---|---|
| 4,678,223 A | * | 7/1987 | Kishi et al. | ................ 296/78.1 |
| 4,685,530 A | * | 8/1987 | Hara | ........................... 180/219 |
| 5,040,632 A | | 8/1991 | Fujii et al. | |
| 2005/0279556 A1 | | 12/2005 | Konno et al. | |

FOREIGN PATENT DOCUMENTS

| | | |
|---|---|---|
| JP | 05319340 A | 12/1993 |
| JP | 06247363 A | 9/1994 |
| JP | 08026162 A | 1/1996 |
| JP | 2003-011872 | 1/2003 |

OTHER PUBLICATIONS

European search report for corresponding European patent application No. 07004268 lists the references above.

* cited by examiner

*Primary Examiner*—Glenn Dayoan
*Assistant Examiner*—Melissa A Black
(74) *Attorney, Agent, or Firm*—Keating & Bennett, LLP (57) ABSTRACT

A motorcycle having an external appearance rich in change without increased cost. A front-side side cover has first edge parts adjoining a body frame. Portions of the first edge parts are in approximately the same position in a vehicle width direction as outermost faces of an outer surface of the body frame adjoined to outermost faces of outer surfaces of the portions. The remaining portion of the first edge parts is inside the outermost face of the outer surface of the body frame adjoined to the outermost face of an outer surface of the remaining portion.

14 Claims, 11 Drawing Sheets

SEEN IN ARROW VIIIb

MOTORCYCLE

RELATED APPLICATIONS

This application claims the benefit of priority under 35 USC 119 of Japanese patent application no. 2006-054658, filed on Mar. 1, 2006, which application is hereby incorporated by reference in its entirety.

BACKGROUND OF THE INVENTION

1. Field of the Invention

The present invention relates to a motorcycle, and more particularly to a body cover that covers left and right sides of the motorcycle.

2. Description of Related Art

In some motorcycles left and right sides of an on-vehicle component mounted to a body frame are covered by side covers. For example, in JP-A-2003-11872, the area between a tank rail and a fuel tank is covered by a resin-made side cover.

In such a motorcycle, the side cover functions merely as an exterior trim component and has a simple external appearance. Metal side covers have been adopted to change the external appearance and to function as a reinforcing member. However, such metal side covers increase weight and cost.

SUMMARY OF THE INVENTION

The present invention addresses these issues and provides a motorcycle with an external appearance rich in change without increased weight and cost.

The present invention provides a motorcycle with a body frame and a body cover. The body cover has a first cover with a first face that adjoins the body frame, has a width finer than a width of an adjoined portion of the body frame, and extends at an angle to a direction along which the body frame extends. A second face adjoins the body frame and the first face, and is inner to the body frame and the first face in a vehicle width direction.

In the present invention, a direction at an angle means a direction not parallel to the direction along which the body frame extends.

According to the present invention, a portion of the first face of the first cover has a frame-like external appearance, and a portion of the second face has a proper external appearance of a cover. Thus, an external appearance rich in change is realized by suitably setting shapes and dimensions of the first and second faces of the first cover, without increased weight and cost.

Other features and advantages of the invention will be apparent from the following detailed description, taken in conjunction with the accompanying drawings which illustrate, by way of example, various features of embodiments of the invention.

DETAILED DESCRIPTION OF THE INVENTION

An embodiment of the present invention is now described with reference to the drawings.

FIGS. 1-11 illustrate a motorcycle according to one embodiment of the present invention. In the following description, the terms "front", "rear", "left" and "right" refer to directions from the perspective of a person seated on the seat.

Figure 1:
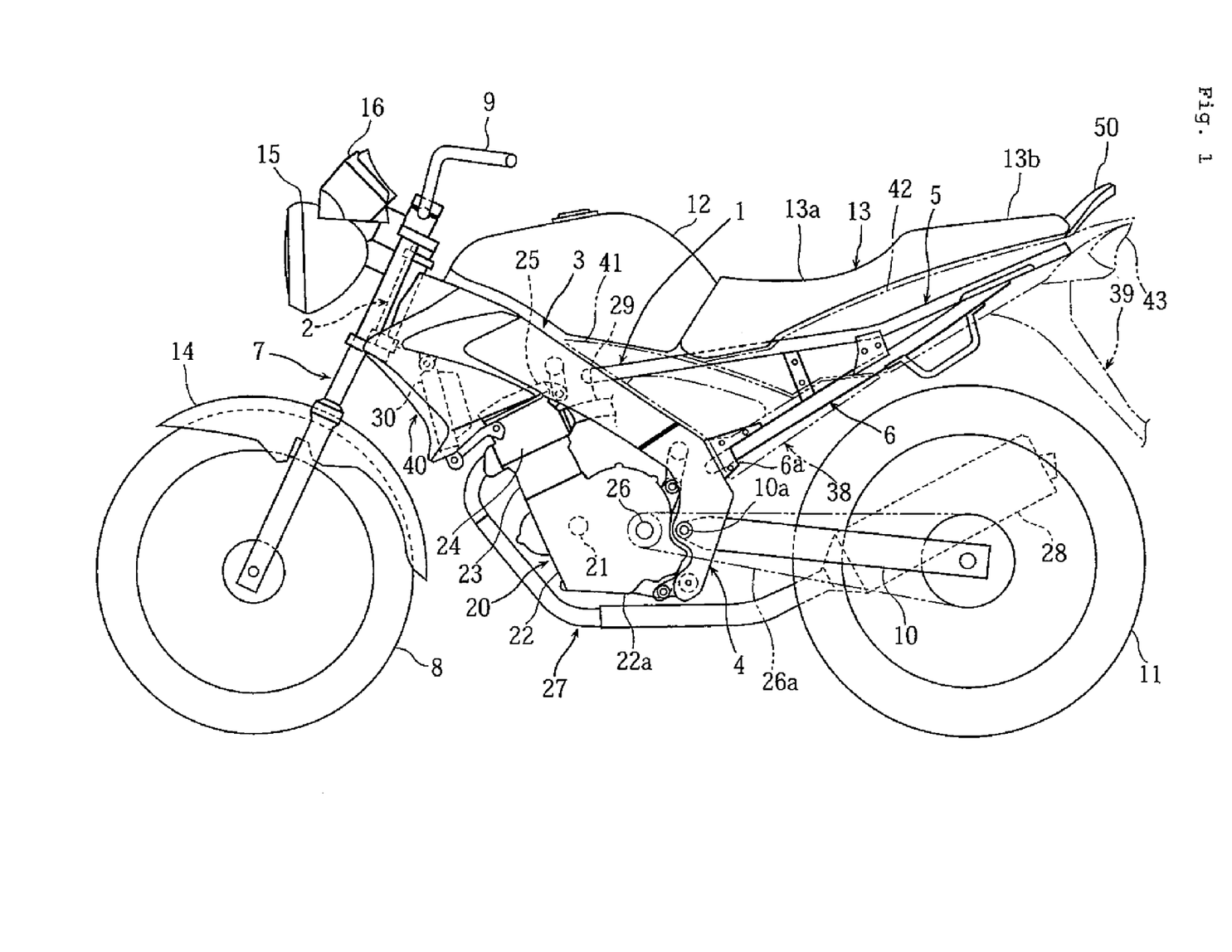
FIG. 1 is a side view of a motorcycle according to one embodiment of the present invention.

The motorcycle comprises a body frame 1 having a head pipe 2 at its front end; left/right tank rails 3,3 slanting downward and rearward from head pipe 2; left/right rear arm brackets 4,4 extending downward to rear ends of tank rails 3,3, left/right seat rails 5,5 slanting upward and rearward from tank rails 3,3; and left/right seat stays 6,6 connected between and bridging rear parts of seat rails 5,5 and arm brackets 4,4, Tank rails 3,3 and rear arm brackets 4,4 are formed by extruding or welding sheet metal. Seat rails 5,5 and seat stays 6,6 are formed by a metal pipe. Seat stays 6,6 are welded to rear arm brackets 4,4 through metal-sheet-made attachment flanges 6*a*,6*a* fixed to front ends of stays 6,6.

Front fork 7 is supported by head pipe 2 and can be steered left and right. Front wheel 8 is shaft supported at a lower end of front fork 7, and steering handle 9 is attached to an upper end of front fork 7. Front fender 14 covers an upper part of front wheel 8 and is attached to front fork 7.

Headlight 15 is disposed in front of head pipe 2, and meter device 16 with a speed meter and the like is disposed above headlight 15.

A front end of a rear arm 10 is supported by rear arm brackets 4,4 and can swing up and down via pivot shaft 10*a*. Rear wheel 11 is shaft-supported at a rear end of rear arm 10, and a rear suspension is disposed between rear arm 10 and rear arm bracket 4.

Fuel tank 12 is mounted on tank rails 3,3, and a seat 13 for two riders is mounted on seat rails 5,5 behind fuel tank 12. A grab bar 50 is behind seat 13.

A water-cooled four-stroke engine 20 is mounted below tank rails 3,3. Engine 20 comprises cylinder block 23, cylinder head 24 and head cover 25 stacked and bolt-fastened to crank case 22. Crank shaft 21 is laterally disposed in a vehicle width direction and accommodated in crank case 22.

Transmission case 22*a* incorporates a transmission and is monolithically formed in a rear side of crank case 22. An output shaft 26 in transmission case 22*a* takes out engine rotation through the transmission, and rear wheel 11 is rotation-driven by output shaft 26 through chain 26*a*.

Exhaust pipe 27 is connected to a front wall of cylinder head 24 and extends along a right side of rear wheel 11 below engine 20 to a connection with exhaust pipe 27. Intake pipe 29 is connected to a rear wall of cylinder head 24 and extends rearward between tank rails 3,3 to a connection with an air cleaner (not shown). Radiator 30 holds engine cooling water to a predetermined temperature and is disposed in a forward upper part of engine 20.

Seat 13 is monolithically formed and has a front part 13*a* for a driver and a rear part 13*b* for a rider. A front end of seat 13 is detachably engaged with fuel tank 12. A rear end of seat 13 is locked by a lock mechanism between seat rails 5,5 that can be unlocked by key-operating a key cylinder 45 disposed in rear fender part 39b. When unlocked by this key operation, seat 13 can be detached upward.

Front ends of tank rails 3,3 and the exterior of radiator 30 are covered by resin-made left/right front covers 40,40. Front covers 40,40 function as an air scoop introducing a traveling wind to radiator 30.

Figure 2:
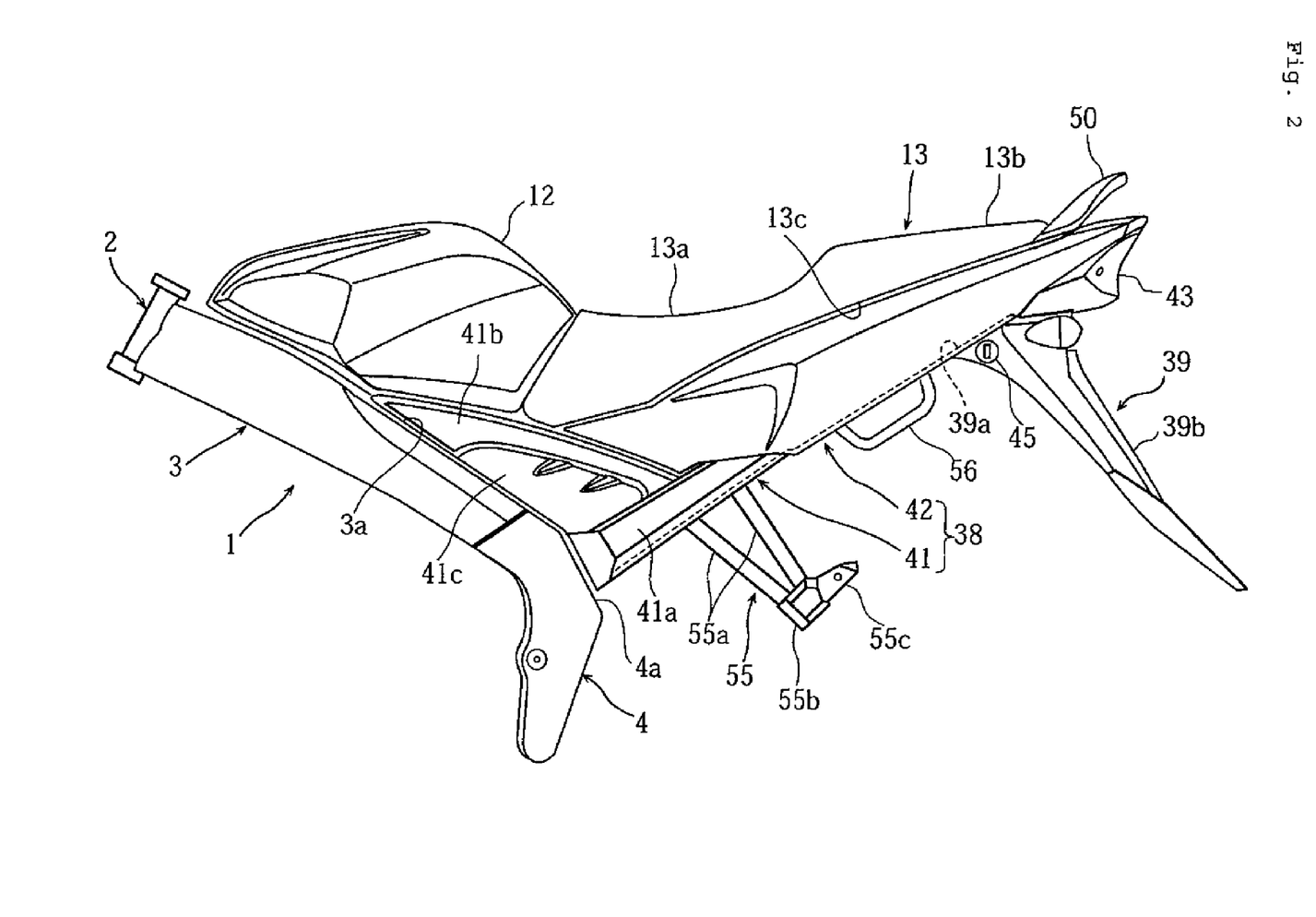
FIG. 2 is a side view of a side cover disposed on the motorcycle of FIG. 1.

The exteriors of seat rails 5,5 and seat stays 6,6 are covered by resin-made left/right side covers 38,38. Each side cover 38 is divided into a front-side side cover (first cover) 41 and a rear-side side cover (third cover) 42.

Rear fender 39 covers an upper part of rear wheel 11 and is disposed on lower faces of side covers 38,38. Front fender part (second cover) 39a of rear fender 39 extends in a front/rear direction and covers a downside of the approximate whole length of left/right seat stay 6. Rear fender part 39b slants downward and rearward from a rear end of front fender part 39a.

Rear-side side covers 42,42 extend between a left/right lower edge 13c of seat 13 and seat stay 6 and form a streamline shape in a front/rear direction. Tail light 43 is mounted to a rear end opening of rear-side side covers 42,42.

Tandem left/right footrests 55,55 for supporting a rear seat rider's feet are welded to front parts of seat stays 6,6. Each footrest 55 has two front/rear pipe-made footrest arms 55a, 55a extending rearward and downward from seat stay 6, a footrest bracket 55b fixed to lower ends of footrest arms 55a,55a, and a foot putting member 55c supported by footrest bracket 55b and turnable between use and storage positions.

Figure 9:
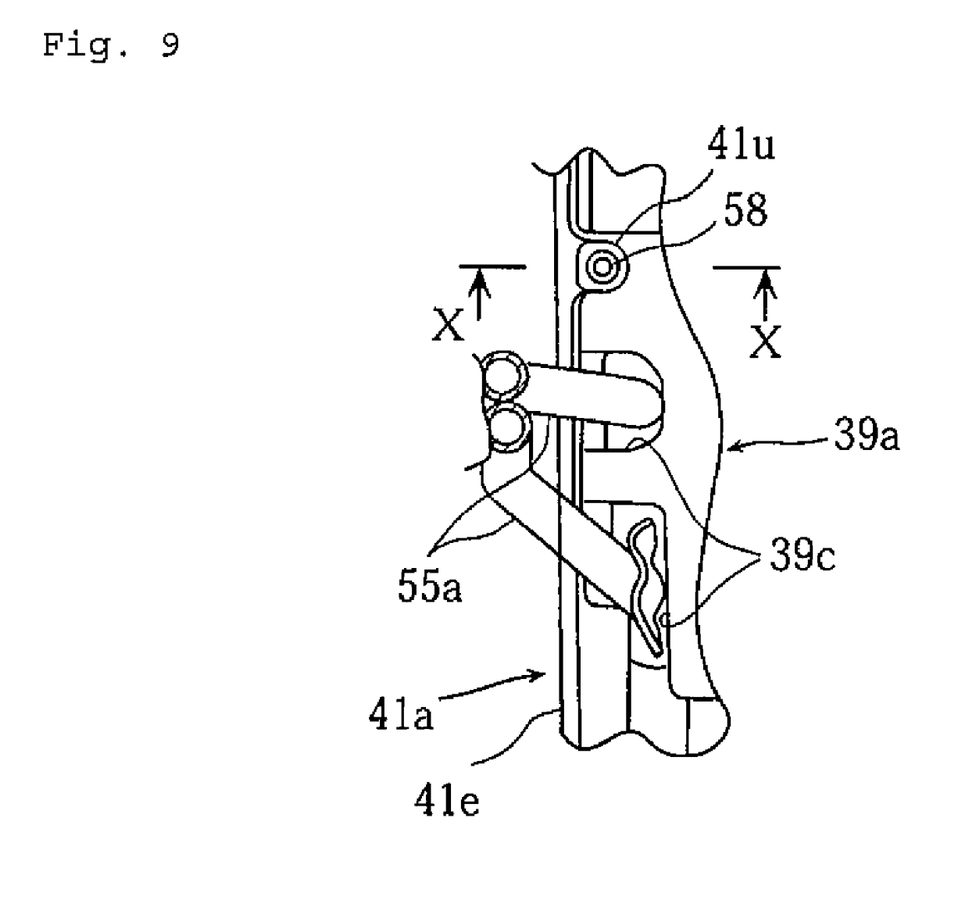
FIG. 9 is a bottom view of the front-side side cover.

Footrest arms 55a,55a extend downward from seat stays 6,6 and are inserted through notches 39c formed in front fender part 39a (FIG. 9). The connection of each footrest arm 55a to seat say 6 is approximately covered by front fender part 39a so that the connection is not visible from outside.

A grip 56 to be grasped when using a center stand (not shown) is attached to left seat stay 6 to the rear of tandem footrest arm 55.

Front-side side covers 41,41 have, in side view, an approximately inverse triangle shape covering an area surrounded by tank rail 3, rear arm bracket 4, fuel tank 12, seat 13 and rear-side side cover 42.

A recovery tank that supplies cooling water to radiator 30, a fuel supply pipe that supplies fuel to engine 20 and a power source connector are disposed within front-side side covers 41,41.

Figure 3:
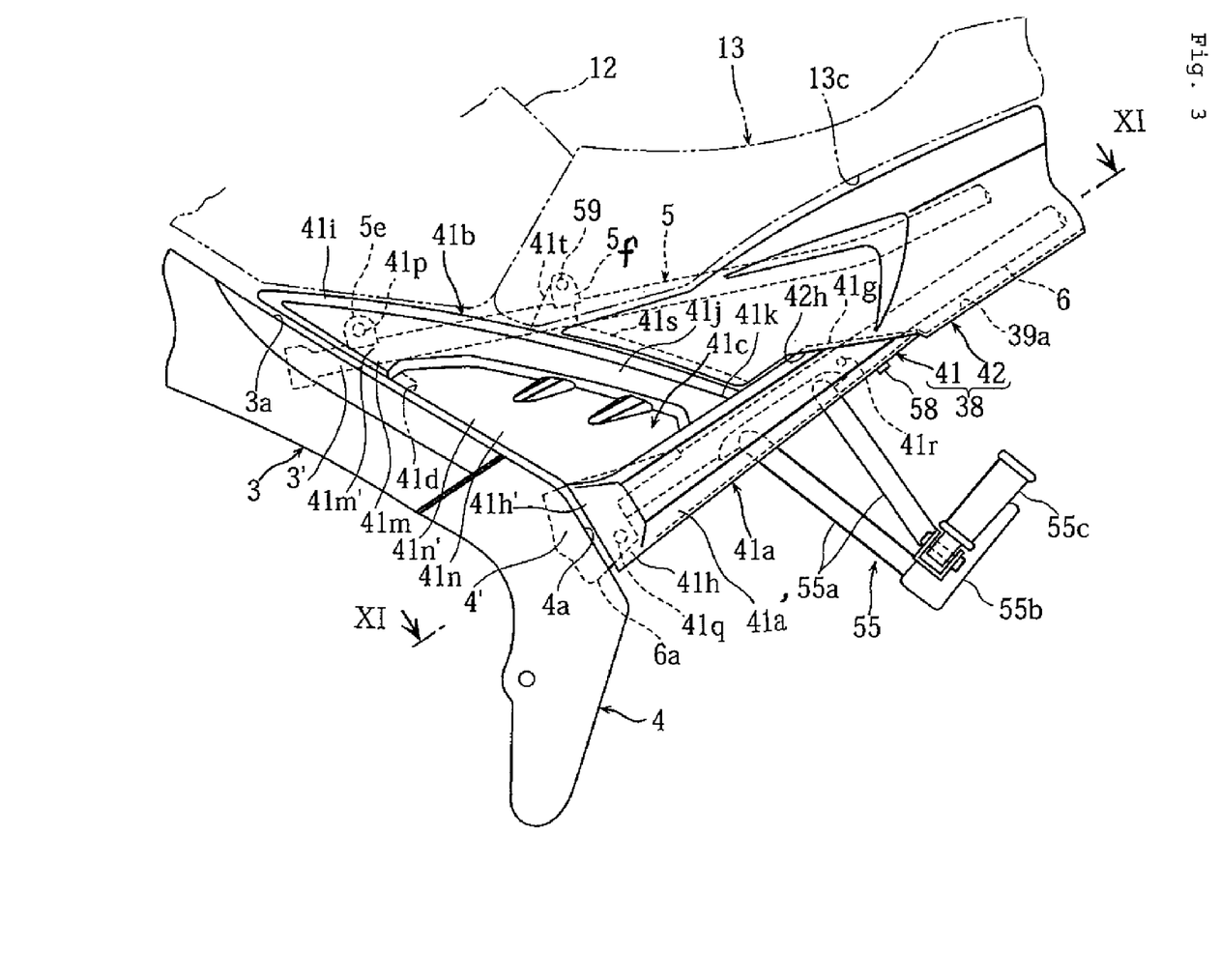
FIG. 3 is a side view of a front-side side cover of the side cover.

An adjusting notch 41d for adjusting an idling rotation rate is formed in a portion of the right front-side side cover 41 facing a carburetor, As can be seen in FIG. 3, which depicts left front-side side cover 41, notch 41d is provided only in right front-side side cover 41.

Since left/right front-side side covers 41 have a left/right symmetrical shape, a detailed explanation is now provided for left front-side side cover 41.

Figure 4:
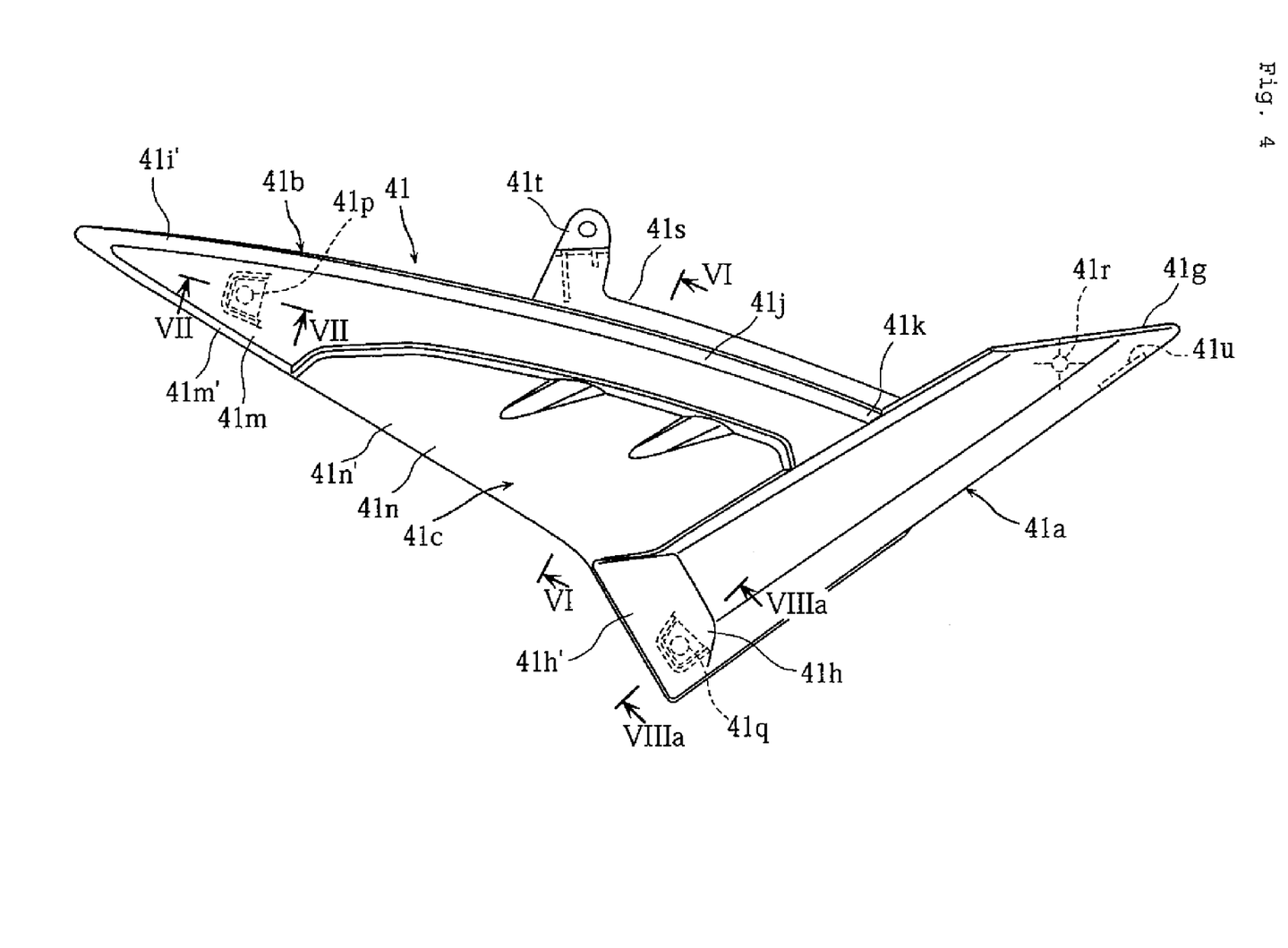
FIG. 4 is a side view of the front-side side cover.
Figure 5:
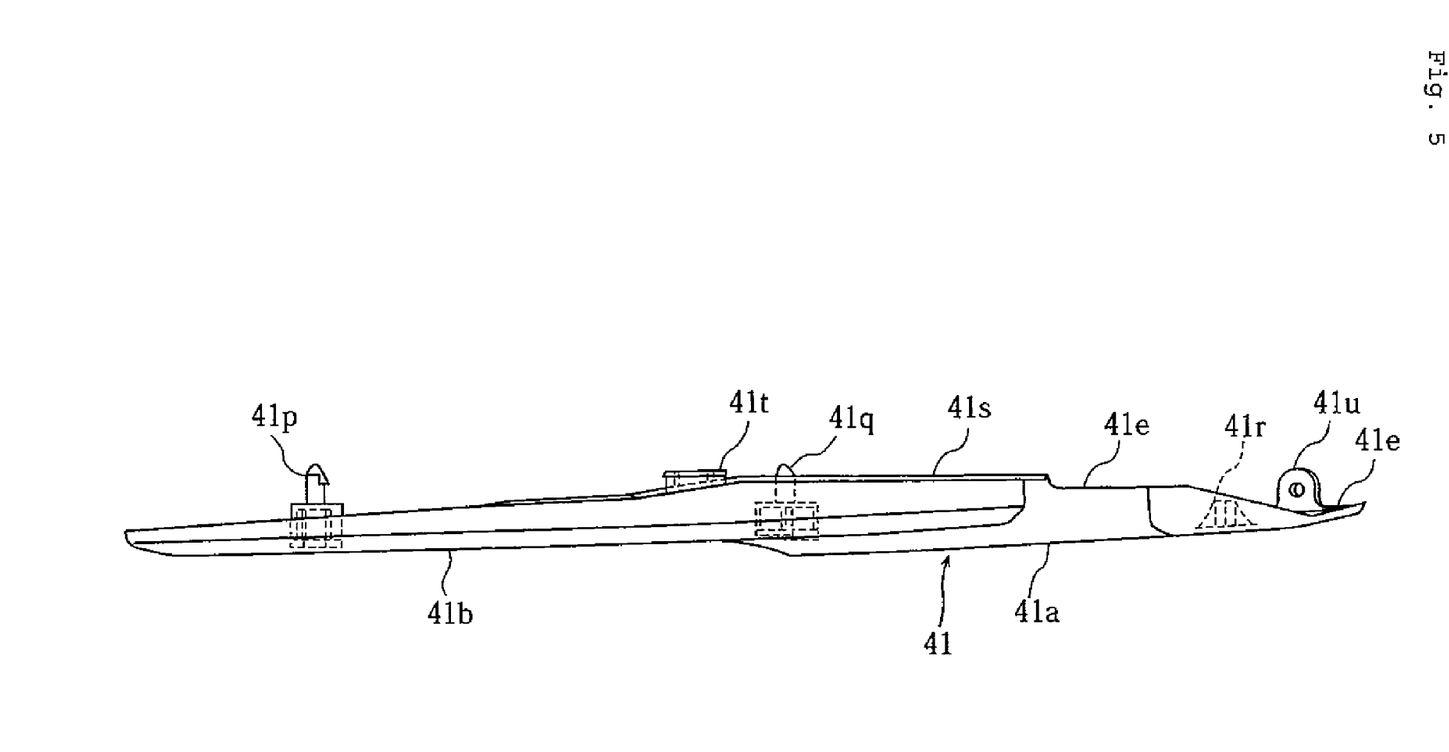
FIG. 5 is a front view of the front-side side cover.

The left front-side side cover (first cover) 41 has a first edge part disposed to adjoin body frame 1. Front-side side cover 41 has a downside continuous cover part (first face) 41a, an upside continuous cover part (first face) 41b, and a stepped-down cover part (second face) 41c.

Downside continuous cover part (first face) 41a adjoins a rear slant face 4a of rear arm bracket 4, extends upward and rearward from rear slant face 4a in a direction having a predetermined angle with respect to a direction along which tank rail 3 extends, and covers an outer side of seat stay (rear frame) 6.

The upside continuous cover part (first face) 41b adjoins a rear slant face 3a of tank rail 3, and slants downward from rear slant face 3a while somewhat curving toward a longitudinal direction center part of downside continuous cover part 41a.

The stepped-down cover part (second face) 41c is an approximately flat face surrounded by upside/downside continuous cover parts 41b,41a and tank rail 3, and is inner to tank rail 3 and parts 41b,41a in a vehicle width direction. Upside/downside continuous cover parts 41b,41a are connected at a position separated from tank rail 3.

An adjacent edge part (first edge part) 41h of downside continuous cover part 41a adjoining rear arm bracket 4, and an adjacent edge part (first edge part) 41m of upside continuous cover part 41b adjoining tank rail 3, constitute one portion between adjacent edge parts of front-side side cover 41, and an adjacent edge part 41n of stepped-down cover part 41c that adjoins tank rail 3 and rear arm bracket 4 constitutes a remaining portion of the adjacent edge part of front-side side cover 41.

Figure 6:
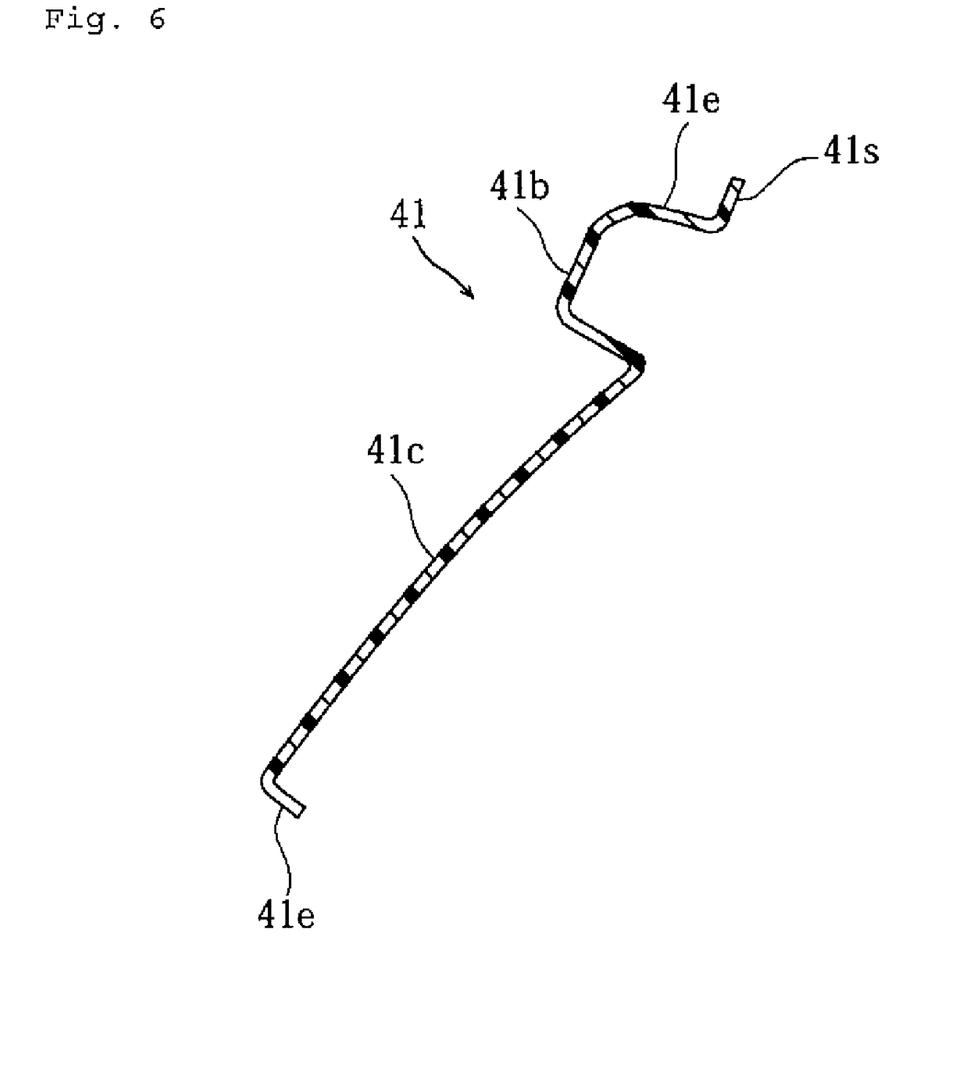
FIG. 6 is a sectional view of the front-side side cover taken through line VI-VI of FIG. 4.

Outermost face 41h' of adjacent edge part 41h is in approximately the same position, in a vehicle width direction, as edge part 4' of adjoining rear arm bracket 4. Outermost face 41m' of adjacent edge part 41m is in approximately the same position, in a vehicle width direction, as edge part 3' of adjoining tank rail 3. Outermost face 41n' of adjacent edge part 41n is stepped-down to be inner to edge parts 3',4' of tank rail 3 and rear arm bracket 4 in the vehicle width direction.

Downside continuous cover part 41a has, in cross-section, an approximate U-shape opening inside in the vehicle width direction. Part 41a extends rearward of its connection to upside continuous cover part 41b. Rear edge 41g of part 41a enters notch 42h of rear-side side cover (third cover) 42. Thus, downside continuous cover part 41a has an external appearance of a body frame extending rearward and passing inside of rear-side side cover 42.

Downside continuous cover part 41b also has, in cross-section, an approximate U-shape opening inside in the vehicle width direction. Front end part 41i of part 41b has an approximately pointed shape; intermediate part 41j is finer than front end part 41i; and rear end part 41k is widened toward the end and connected to downside continuous cover part 41a.

Thus, upside continuous cover part 41b has a frame-like external appearance connecting rear slant face 3a of tank rail 3 and downside continuous cover part 41a, and an external appearance of supporting fuel tank 12.

Stepped-down cover part 41c is inner to upside/downside continuous cover parts 41b,41a in the vehicle width direction. Thus, cover part 41c has a proper external appearance of a cover covering an area surrounded by upside/downside cover parts 41b,41a and tank rail 3.

The outer surfaces of upside/downside continuous cover parts 41b,41a and stepped-down part 41c may also have different grain patterns. Upside/downside continuous cover parts 41b,41a may be finished to look like a frame, and stepped-down cover part 41c may be finished to look like a cover. Upside/downside continuous cover parts 41b,41a and stepped-down cover part 41c may also be painted in different colors. Further, a graphic may be adhered to one or both of parts 41b,41a and cover part 41c.

An outer peripheral part 41e of front-side side cover 41 is bent inside in the vehicle width direction to increase the rigidity of front-side side cover 41.

Downside continuous cover part 41a adjoins adjacent edge part 41h, and has a continuous part (second edge part) 41a' extending rearward from rear arm bracket 4. Bent part 41e is formed in a downside of continuous part 41a' and connected to front fender part (second cover) 39a. Bent parts 41e,41e of left/right front-side side covers 41,41 and front fender part 39a close downsides of left/right seat stays 6,6, thereby preventing water splashed up by wear wheel 11 from entering into front-side side cover 41.

Front-side side cover 41 is detachably attached to body frame 1. Inspection and maintenance of the recovery tank, the fuel supply pipe, the power source connector, and the like can be performed by detaching front-side side cover 41.

Front/rear positioning protrusions 41p,41q are monolithically formed, respectively, in front end part 41i of upside continuous cover part 41b and front end part (adjacent edge part) 41h of downside continuous cover part 41a, and protrude inside in the vehicle width direction. Positioning part 41r is formed in a rear end part of downside continuous cover part 41a.

Figure 7:
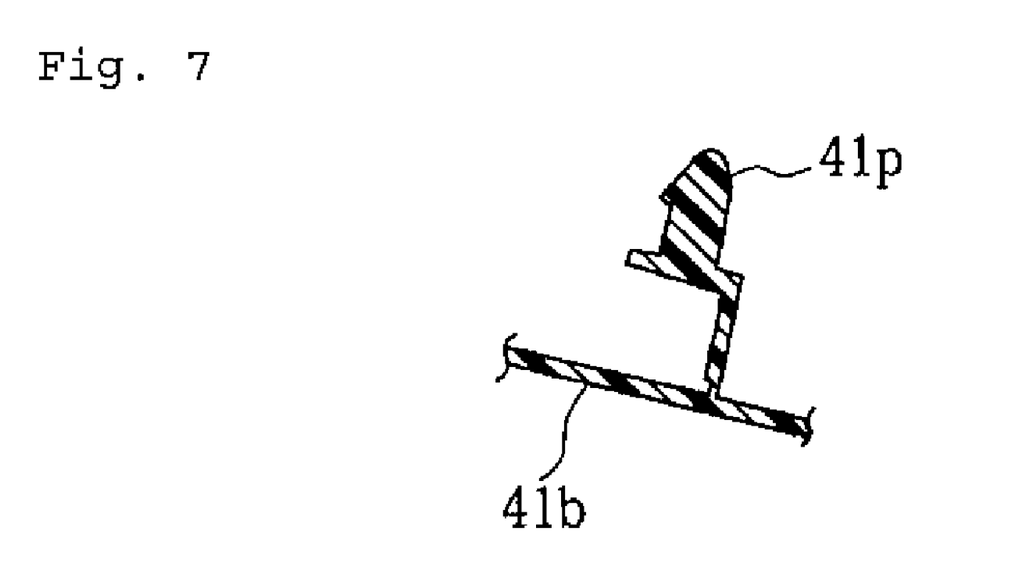
FIG. 7 is a sectional view of a positioning part of the front-side side cover taken through line VII-VII of FIG. 4.
Figure 8:
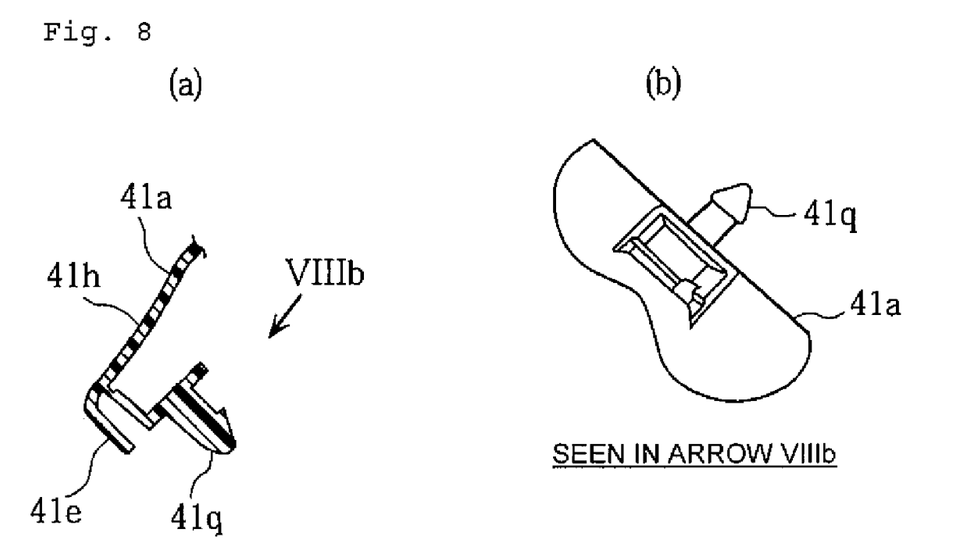
FIG. 8 is a view of the positioning part of the front-side side cover.

Front positioning protrusion 41p is detachably insertion-fixed from an outer side to an engaging hole of positioning bracket 5e connected to a front end part of seat rail 5 so as to stand. Rear positioning protrusion 41q is detachably insertion-fixed from the outer side to an engaging hole of attaching flange 6a of seat stay 6.

Figure 11:
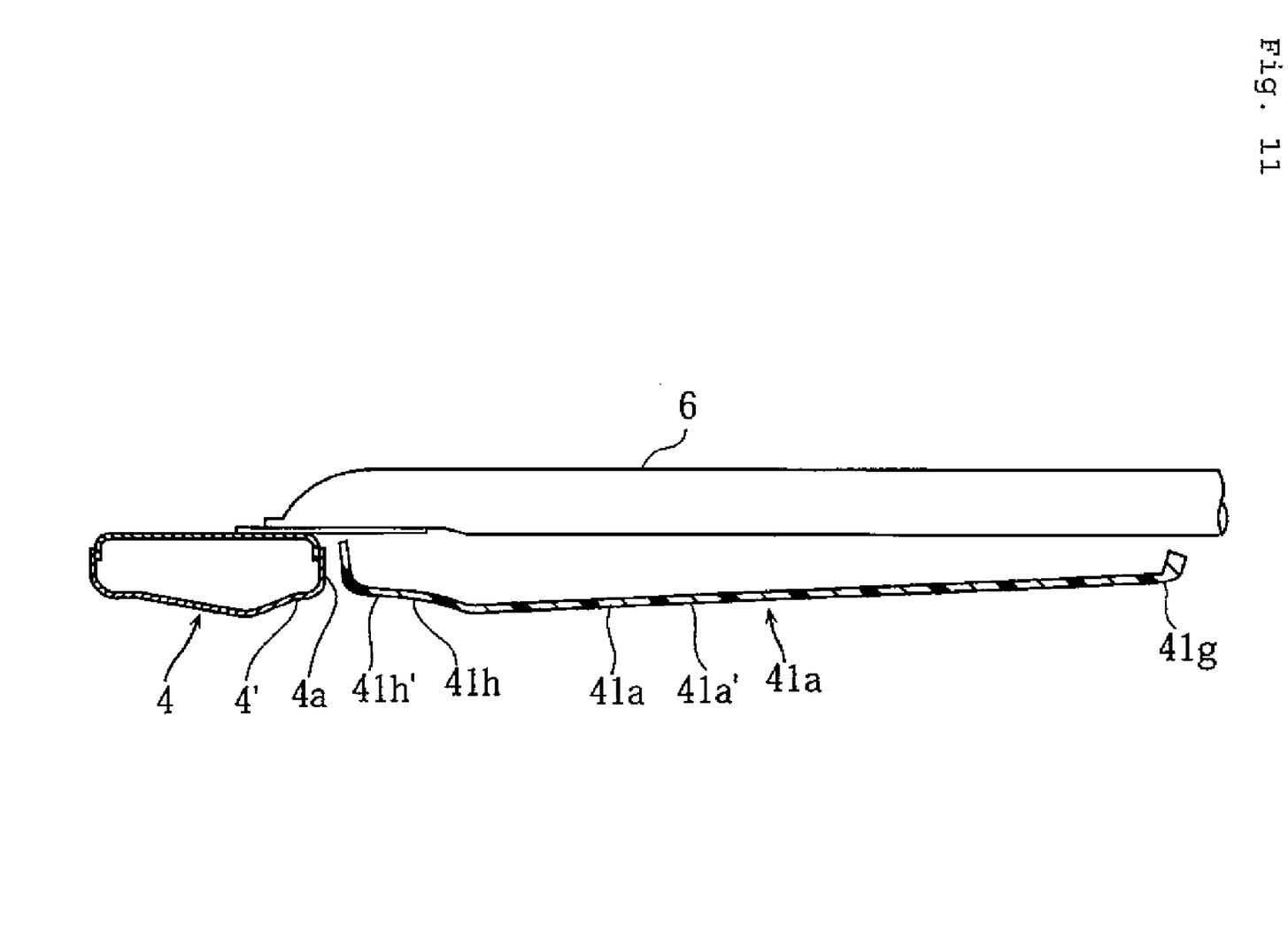
FIG. 11 is a sectional view of the front-side side cover taken through line XI-XI of FIG. 3.

Flange part 41s protrudes upward from an inner edge of bent part 41e and enters a front edge part of rear-side side cover 42. Attaching part 41t is formed in a front end part of flange part 41s and extends upward so as to be concealed inside seat 13 when seen from a side.

Attaching part 41t is detachably fixed to attaching bracket 5f, which is connected so as to stand in a rear side of positioning bracket 5e of seat rail 5, by bolt 59 mounted from the outer side.

Figure 10:
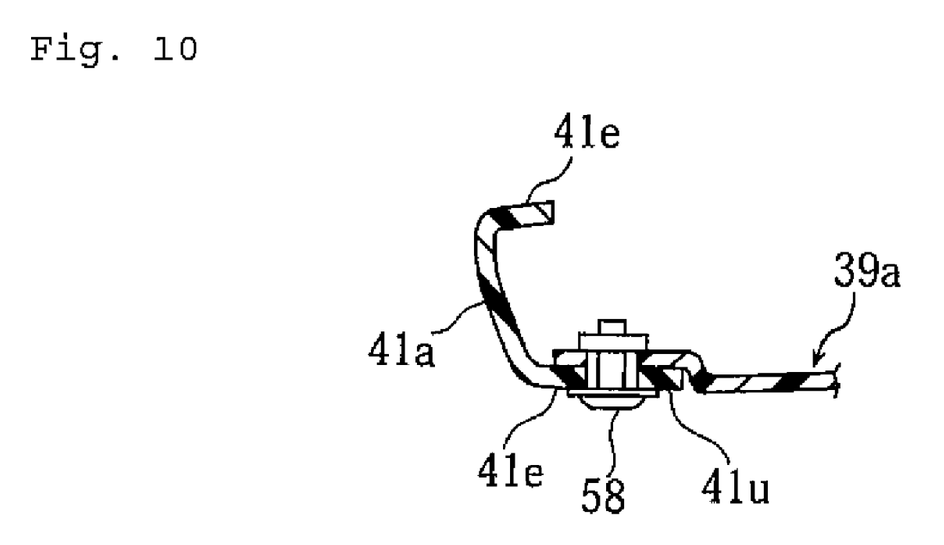
FIG. 10 is a sectional view of the front-side side cover taken through line X-X of FIG. 9.

Attaching part 41u protruding inner to bent part 41e in the vehicle width direction is formed in a rear end part of downside bent part 41e. Attaching part 41u overlaps a lower face of front fender part 39a, and is detachably fixed to front fender part 39a by attaching screw 58 meshed from below.

In order to detach front-side side cover 41, attaching screw 58 is removed from an outer downside, seat 13 is detached upward by releasing a lock mechanism, and bolt 59 is detached from the outer side. Under this state, front-side side cover 41 is detached by outwardly pulling out front/rear positioning protrusions 41p,41q.

According to this embodiment, downside continuous cover part 41a of front-side side cover 41 extends at an angle to a direction along which tank rail 3 extends. Adjacent edge part 41h of cover part 41a adjoining rear arm bracket 4 is in approximately the same position in the vehicle width direction as edge part 4' of rear arm bracket 4 adjoined to outermost face 41' of adjacent edge part 41h. Adjacent edge part 41n of stepped-down cover part 41c is inner to edge parts 3',4' of tank rail 3 and rear arm bracket 4 in the vehicle width direction, which are adjoined to outermost face 41n' of adjacent part 41n. As a result, downside continuous cover part 41a has a frame-like external appearance, and stepped-down cover part 41c has a proper external appearance of a cover. By suitably setting the shape, dimension and the like of downside continuous cover part 41a, a frame design rich in change is realized without increasing weight and cost.

Since adjacent edge part 41m of upside continuous cover part 41b adjoining tank rail 3 is in approximately the same position in the vehicle width direction as edge part 3' of tank rail 3 adjoined to outermost face 41m' of adjacent edge part 41m, upside continuous cover part 41b has a frame-like external appearance, thereby realizing a low cost novel frame design by upside continuous cover part 41b and downside continuous cover part 41a.

Since front-side side cover 41 is formed by downside/upside continuous cover parts 41a,41b and stepped-down cover part 41c inner to the former in the vehicle width direction, the outer surface has irregularities and increases the rigidity of front-side side cover 41.

Front-side side cover 41 assists in establishing a riding position. That is, the riding position or posture may be changed by recognizing and grasping a changeover part (step) between downside/upside continuous cover parts 41a,41b and stepped-down cover 41c in the inside of the legs with a knee grip and the like.

Finishing cover parts 41b,41a and stepped-down cover part 41c with different grain patterns further partitions the parts to appear as a frame and cover.

Since bent part 41e is formed in the outer periphery of front-side side cover 41 and extends and curves inside, the rigidity of front-side side cover 41 is increased and deformation by external forces is prevented.

Since bent part 41e is formed in continuous part 41a' of downside continuous cover part 41a, extending in the direction separating from rear arm bracket 4 while adjoining adjacent edge part 41h, and bent part 41e is connected to front fender part 39a, water splashed up by rear wheel 11 cannot enter below seat 13.

Further, since attaching part 41u is formed in bent part 41e and is fixed to front fender part 39a by attaching screw 58 mounted from below, a downside of front-side side cover 41 is attached by utilizing front fender part 39a, making a separate component such as bracket unnecessary.

Since continuous part 41a' of downside continuous cover part 41a slants upward so as to be separated from rear arm bracket 4, and rear edge part 41g enters inside of rear-side side cover 42, downside continuous cover part 41a has an external appearance of extending more rearward in rear-side side cover 42, and thus is finished more frame-likely.

Since downside continuous cover part 41a covers seat stay 6, even when seat stay 6 is a fine pipe in strength, an external appearance of a strong frame is obtained.

Since attaching part 41t extending to be concealed inside seat 13 is formed in front-side side cover 41, and attaching part 41t is fixed to attaching bracket 5f of seat rail 5 by bolt 59, there is no deterioration of external appearance by attaching part 41t being visible and, because attaching part 41t is exposed upward by removing seat 13, front-side side cover 41 is easily removed.

Since seat 13 is removed by releasing a lock by a key operation, attachment/detachment of front-side side cover 41 is more easily performed.

Since positioning protrusion 41q of downside continuous cover part 41a is detachably attached by insertion-fixing seat stay 6 to a hole of attaching flange 6a connected to rear arm bracket 4, it is possible to attach front-side side cover 41 by such a simple structure as to form only the hole of attaching flange 6a.

Although the described embodiment includes a downside side cover part 41a covering seat stay 6 and an upside continuous cover part 41b connecting downside continuous cover part 41a and tank rail 3, the invention is not so limited. For example, only downside continuous cover part 41a may suffice, and continuous cover parts other than the upside/downside continuous cover parts may be provided. In this case, since front-side side cover 41 is made of resin, the continuous cover part can be freely set.

Further, although the body frame (tank rail) has been described as an angular pipe, the body frame may also be a round pipe-like body frame.

The particular embodiments of the invention described in this document should be considered illustrative, rather than restrictive. Modification to the described embodiments may be made without departing from the spirit of the invention as defined by the following claims.

The invention claimed is:

1. A motorcycle comprising:
   a body frame having a length, a width, and a thickness extending in a vehicle width direction; and
   a body cover including:
   a first cover including a first face that adjoins to the body frame, the first face having a length, a width, and a thickness extending in the vehicle width direction;
   the width of the first face being smaller than a width of a portion of the body frame to which the body cover adjoins in a side view of the motorcycle;
   the first face being arranged to extend at an angle with respect to a direction along which the body frame extends;
   a second face that adjoins to the body frame and the first face, and positioned closer to a center of the motorcycle in the vehicle width direction than the body frame and the first face, the second face being substantially flat;
   a bent portion bent inwards toward the center of the vehicle in the vehicle width direction, the bent portion being located in an edge portion in a side opposite to an edge adjoining the second face; wherein
   the first face and the second face are integrally formed and made of resin.

2. A motorcycle as claimed in claim 1, wherein the first and second faces include different outer surfaces.

3. A motorcycle as claimed in claim 1, wherein the bent portion is connected to a second cover disposed inward in the vehicle width direction.

4. A motorcycle as claimed in claim 3, wherein the bent portion is attached to the second cover.

5. A motorcycle as claimed in claim 1, wherein a portion of the first face enters a third cover in the vehicle width direction.

6. A motorcycle as claimed in claim 1, wherein the first cover includes a plurality of first faces, and the second face is disposed between the plurality of first faces.

7. A motorcycle as claimed in claim 6, wherein the plurality of first faces are mutually connected in a position arranged separate from the body frame, and the second face is defined by a portion surrounded by the mutually connected plurality of first faces.

8. A motorcycle as claimed in claim 1, wherein the first cover includes an attaching portion concealed inside a detachable vehicle component, and the attaching portion is detachably attached to the body frame.

9. A motorcycle as claimed in claim 8, wherein the vehicle component is a seat.

10. A motorcycle as claimed in claim 9, wherein the seat is supported by the body frame, and the seat includes a lock mechanism.

11. A motorcycle as claimed in claim 1, wherein the first face covers a frame member defining one portion of the body frame.

12. A motorcycle as claimed in claim 11, wherein the frame member is attached to a portion adjoined to the first cover of the body frame through an attaching flange provided in the body frame, and the first cover is detachably attached to the attaching flange.

13. A motorcycle as claimed in claim 1, wherein the body frame includes tank rails disposed below a fuel tank, and the first cover adjoins the tank rails.

14. A motorcycle as claimed in claim 11, wherein the frame member is a rear portion of the frame extending rearward from a portion that adjoins the first cover, thereby supporting the seat.

* * * * *